(12) United States Patent
Kashima et al.

(10) Patent No.: US 9,338,771 B2
(45) Date of Patent: May 10, 2016

(54) METHOD AND APPARATUS FOR ALLOCATING RESOURCES USING NESTED BIT MAPPING

(75) Inventors: Tsuyoshi Kashima, Tokyo (JP); Sigit Puspito Wigati Jarot, Kuala Lumpur (MY); Frank Frederiksen, Klarup (DK); Troels Kolding, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 290 days.

(21) Appl. No.: 12/532,085

(22) PCT Filed: Mar. 19, 2008

(86) PCT No.: PCT/IB2008/000664
§ 371 (c)(1),
(2), (4) Date: Jul. 19, 2010

(87) PCT Pub. No.: WO2008/135820
PCT Pub. Date: Nov. 13, 2008

(65) Prior Publication Data
US 2010/0284348 A1  Nov. 11, 2010

Related U.S. Application Data

(60) Provisional application No. 60/895,616, filed on Mar. 19, 2007.

(51) Int. Cl.
*H04W 72/04* (2009.01)
*H04W 48/08* (2009.01)
(52) U.S. Cl.
CPC ............ *H04W 72/042* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 6,560,610 B1 | 5/2003 | Eatherton et al. | |
| 2006/0009228 A1* | 1/2006 | Kang et al. | 455/450 |
| 2006/0153227 A1* | 7/2006 | Hwang et al. | 370/465 |
| 2007/0060149 A1 | 3/2007 | Lim et al. | |
| 2007/0201350 A1* | 8/2007 | Papasakellariou | 370/208 |
| 2008/0020778 A1* | 1/2008 | Pi | H04W 72/005 455/450 |
| 2008/0062178 A1* | 3/2008 | Khandekar | H04L 67/306 345/440 |
| 2008/0075032 A1* | 3/2008 | Balachandran et al. | 370/317 |
| 2010/0098020 A1* | 4/2010 | Kim | H04L 1/0027 370/330 |
| 2010/0172316 A1* | 7/2010 | Hwang et al. | 370/330 |

FOREIGN PATENT DOCUMENTS

| | | |
|---|---|---|
| EP | 1681790 A | 7/2006 |
| WO | 2006039812 A | 4/2006 |

(Continued)

OTHER PUBLICATIONS

International Search Report and Written Opinion of the International Searching Authority for PCT Application No. PCT/IB2008/000664, dated Dec. 18, 2008, 13 pages.

(Continued)

*Primary Examiner* — Mohammad Adhami
(74) *Attorney, Agent, or Firm* — Ditthavong & Steiner, P.C.

(57) ABSTRACT

An approach is provided for generating a control signal for allocating one or more physical resource blocks to a terminal for communicating over a network. The control signal is separately coded and utilizes a nested bit mapping scheme to specify the allocation.

18 Claims, 14 Drawing Sheets

(56) References Cited

FOREIGN PATENT DOCUMENTS

| WO | 2006102744 A | 10/2006 |
| WO | 2006105018 A | 10/2006 |

OTHER PUBLICATIONS

Ericsson, "Downlink L1/L2 Control Signaling" TSG-RAN WG1 #47, Riga, Latvia, vol. R1-063147, No. 47, Nov. 6, 2006.

* cited by examiner

METHOD AND APPARATUS FOR ALLOCATING RESOURCES USING NESTED BIT MAPPING

RELATED APPLICATION

This application was originally filed as PCT Application No. PCT/IB2008/000664 on Mar. 19, 2008 and claims priority to U.S. Provisional Application No. 60/895,616 filed on Mar. 19, 2007, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves control signaling, particularly with respect to resource allocation. Traditionally, flexibility and control entail a high cost in terms of overhead and reduced throughput.

SOME EXEMPLARY EMBODIMENTS

Therefore, there is a need for an approach for providing efficient control signaling to allocate network resources.

According to one embodiment of the invention, a method comprises generating a control signal for allocating one or more physical resource blocks to a terminal for communicating over a network, wherein the control signal is separately coded and utilizes a nested bit mapping scheme to specify the allocation.

According to another embodiment of the invention, an apparatus comprises an allocation module configured to generate a control signal for allocating one or more physical resource blocks to a terminal for communicating over a network. The control signal is separately coded and utilizes a nested bit mapping scheme to specify the allocation.

According to one embodiment of the invention, a method comprises receiving a control signal specifying allocation of one or more physical resource blocks for communication over a network. The method also comprises determining the allocation according to a nested bit mapping scheme, wherein the control signal is separately coded.

According to yet another embodiment of the invention, an apparatus comprises a transceiver configured to receive a control signal specifying allocation of one or more physical resource blocks for communication over a network. The apparatus also comprises a mapping module configured to determine the allocation according to a nested bit mapping scheme, wherein the control signal is separately coded.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing nested bit map resource allocation for a separately coded control signal are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) EUTRA (Enhanced Universal Terrestrial Radio Access) architecture and L1 and L2 layer protocols, it is recognized by one of ordinary skill in the art that the embodiments of the inventions have applicability to any type of communication system and equivalent protocols.

Figure 1:
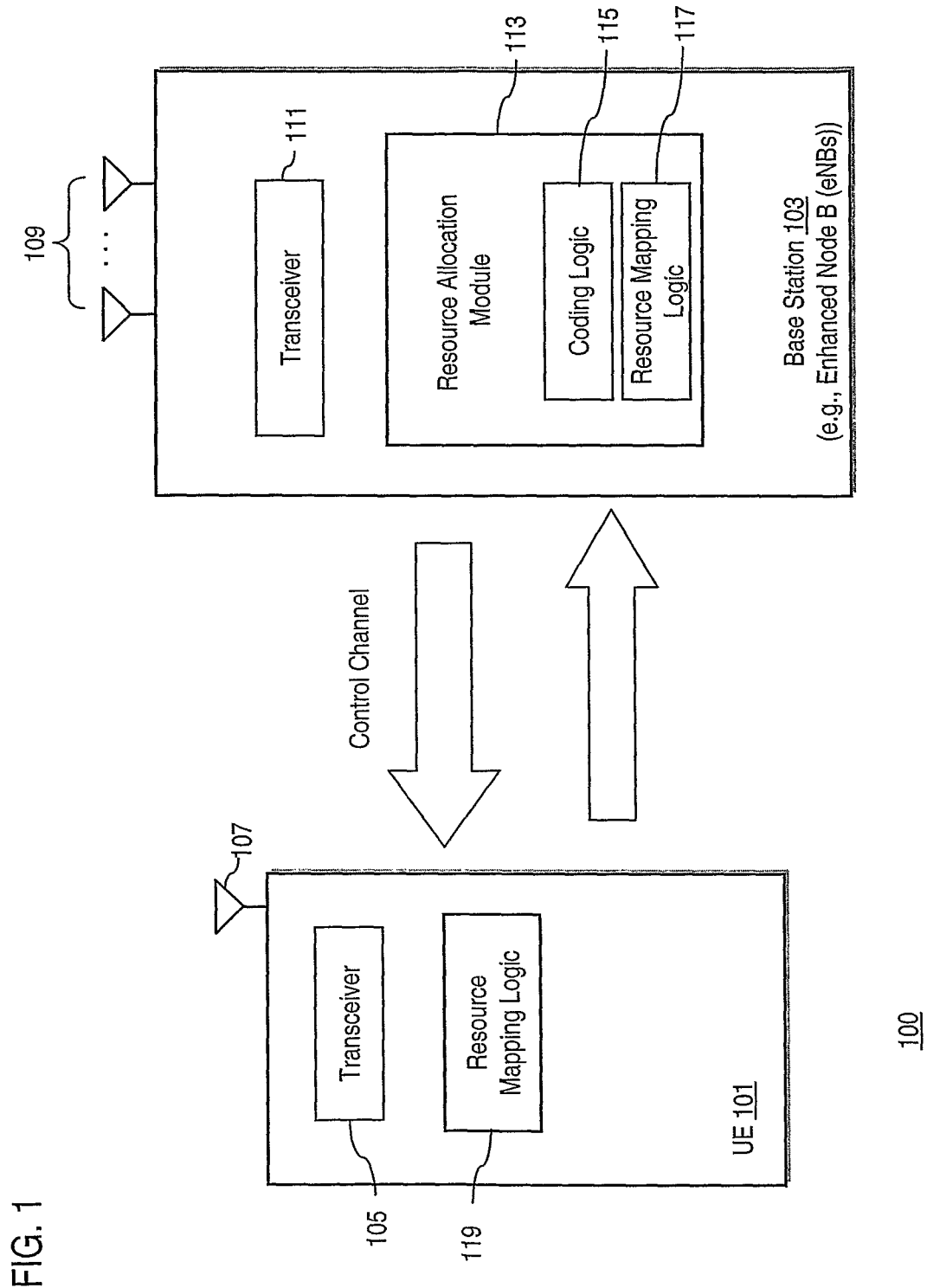
FIG. 1 is a diagram of a communication system capable of providing nested bit map resource allocation for a separately coded control signal, according to an exemplary embodiment of the invention.

FIG. 1 is a diagram of a communication system capable of providing configurable transport data block signaling, according to an exemplary embodiment of the invention. As shown, a communication system 100 includes one or more user equipment (UEs) 101 communicating with a base station 103, which is part of an access network (e.g., WiMAX (Worldwide Interoperability for Microwave Access), 3GPP LTE, etc.). Under the 3GPP LTE architecture, the base station 103 denoted as an enhanced Node B (eNB). The UE 101 can be any type of mobile stations, such as handsets, terminals, stations, units, devices, or any type of interface to the user (such as "wearable" circuitry, etc.). The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands. The UE 101 includes a transceiver 105 and an antenna system 107 that couples to the transceiver 105 to receive or transmit signals from the base station 103. The antenna system 107 can include one or more antennas (of which only one is shown). Accordingly, the base station 103 can employ one or more antennas 109 for transmitting and receiving electromagnetic signals. As with the UE 101, the base station 103 employs a transceiver 111, which transmits information over a downlink (DL) to the UE 101.

Communications between the UE 101 and the base station 103 is governed, in part, by control information exchanged between the two entities. Such control information, in an exemplary embodiment, is transported over a control channel on the downlink (DL) from the base station 103 to the UE 101. It is recognized that one of the challenges related to the control channel in general is that it is desirable to transmit as much information as possible to obtain the greatest flexibility, while reducing the need to provide control signaling as much as possible without loosing any (or only marginal) system performance in terms of throughput or efficiency. In terms of flexibility, it is desirable that the control signal support distributed and localized allocation. Localized allocation type typically allocates a sub-carrier block to one UE 101, and the distributed allocation type allocates the sub-carrier block to multiple UEs.

To indicate which physical resource blocks (or sub-carrier) are allocated to a UE 101, two schemes include: (1) bit mapping, (2) (start, length) by using several bits indicating the start and the length of an allocation block.

The approach (referred to herein as "nested bit mapping") of the system of FIG. 1 for control signaling provides enhanced efficiency in allocating network resources, while minimizing overhead. The signaling is controlled by a resource allocation module 113 that includes a coding logic 115 and resource mapping logic 117, which are shown as part of the base station 103; however, it is contemplated that the resource allocation module 113 can be implemented elsewhere on the network side. According to an exemplary embodiment, L1/L2 control signal is used for UL and DL resource allocation information, and utilizes separate coding for the control fields, rather than joint coding. Hence, the coding logic 115 employs separate coding. Alternatively, it is contemplated that the nested bit mapping approach described herein can be implemented under a joint coding scheme as well. In joint coding, the control information from multiple UEs 101 are encoded together—e.g., a single cycle redundancy check (CRC) can be utilized. With separate coding, the control information for each of the UEs 101 is encoded separately, such that power assignments can be better controlled for individual UEs 101 (which contrasts with the joint coding approach, whereby power allocation is based on the worst user of the group of users). Separate coding can thus achieve larger cell coverage with a fixed transmission power.

The system of FIG. 1 provides an efficient resource allocation scheme for separately coded control signal, while reducing the number of bit used in control channel and providing flexibility to support both distributed and localized allocation as well as small packets. On the user side, the UE 101 provides a resource mapping logic 119 to interpret the resource allocation by the network (e.g., base station 103). In this example, the resources are physical resource blocks (PRB) that correspond to OFDM symbols to provide communication between the UE 101 and the base station 103. That is, the OFDM symbols are organized into a number of physical resource blocks (PRB) that includes consecutive sub-carriers for corresponding consecutive OFDM symbols. The nested mapping approach provides a primary bit map along with one or more supplemental (i.e., secondary) bit maps to convey resource assignments, as next described.

Figure 2A:
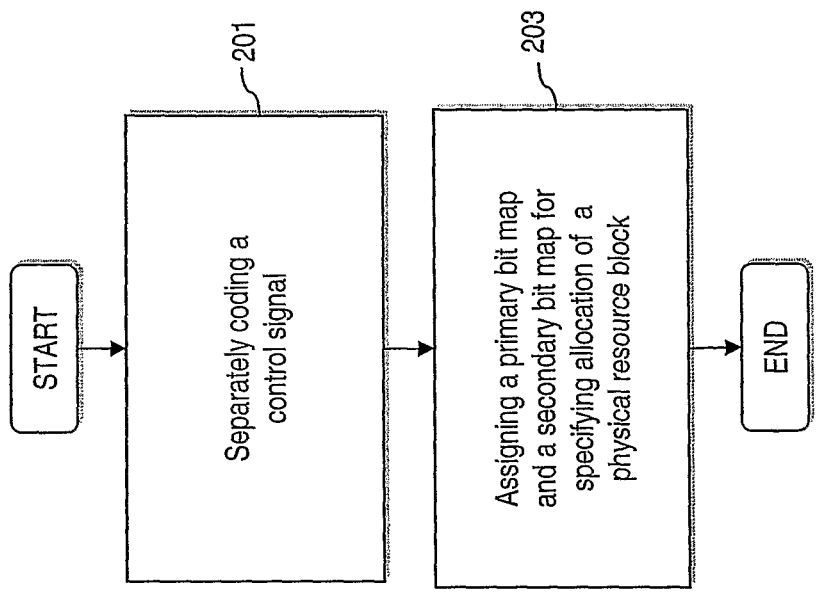
FIGS. 2A and 2B are flowcharts of processes for allocating resources using a nested bit mapping scheme, in accordance with various embodiments of the invention.
Figure 2B:
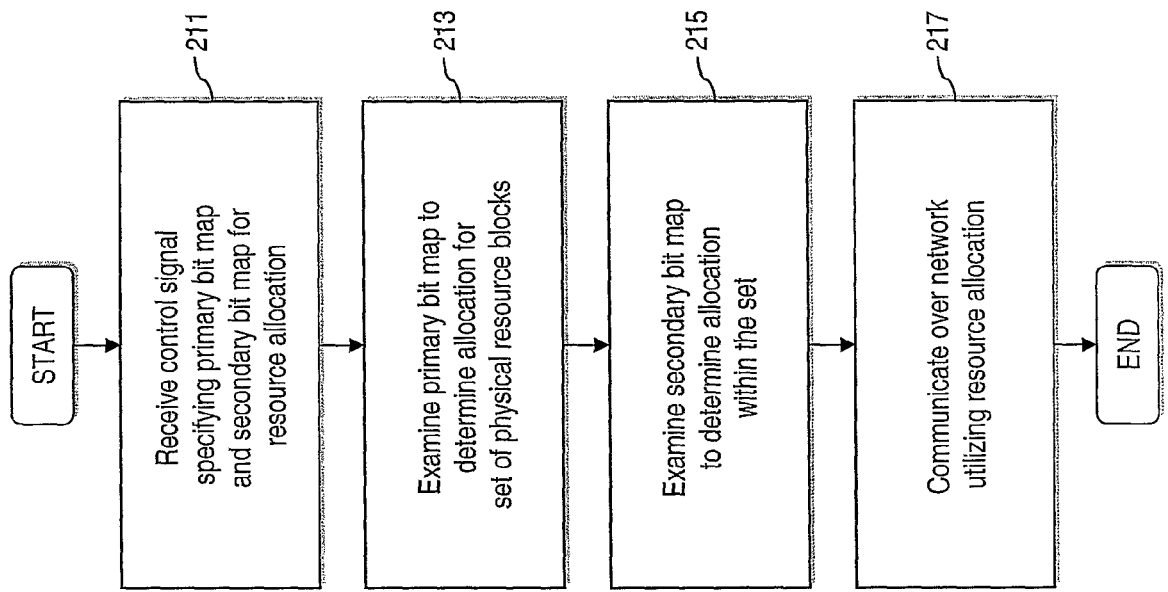

FIGS. 2A and 2B are flowcharts of processes for allocating resources using a nested bit mapping scheme, in accordance with various embodiments of the invention. As mentioned above, each separately coded control signal is associated with a primary bit map and a secondary bit map (per steps 201 and 203). In one embodiment, the primary bit map can indicate the resource blocks that are allocated to a UE 101, wherein each bit of the primary bit map corresponds to a set of adjacent PRBs (referred to as one "allocation unit").

Figure 4:
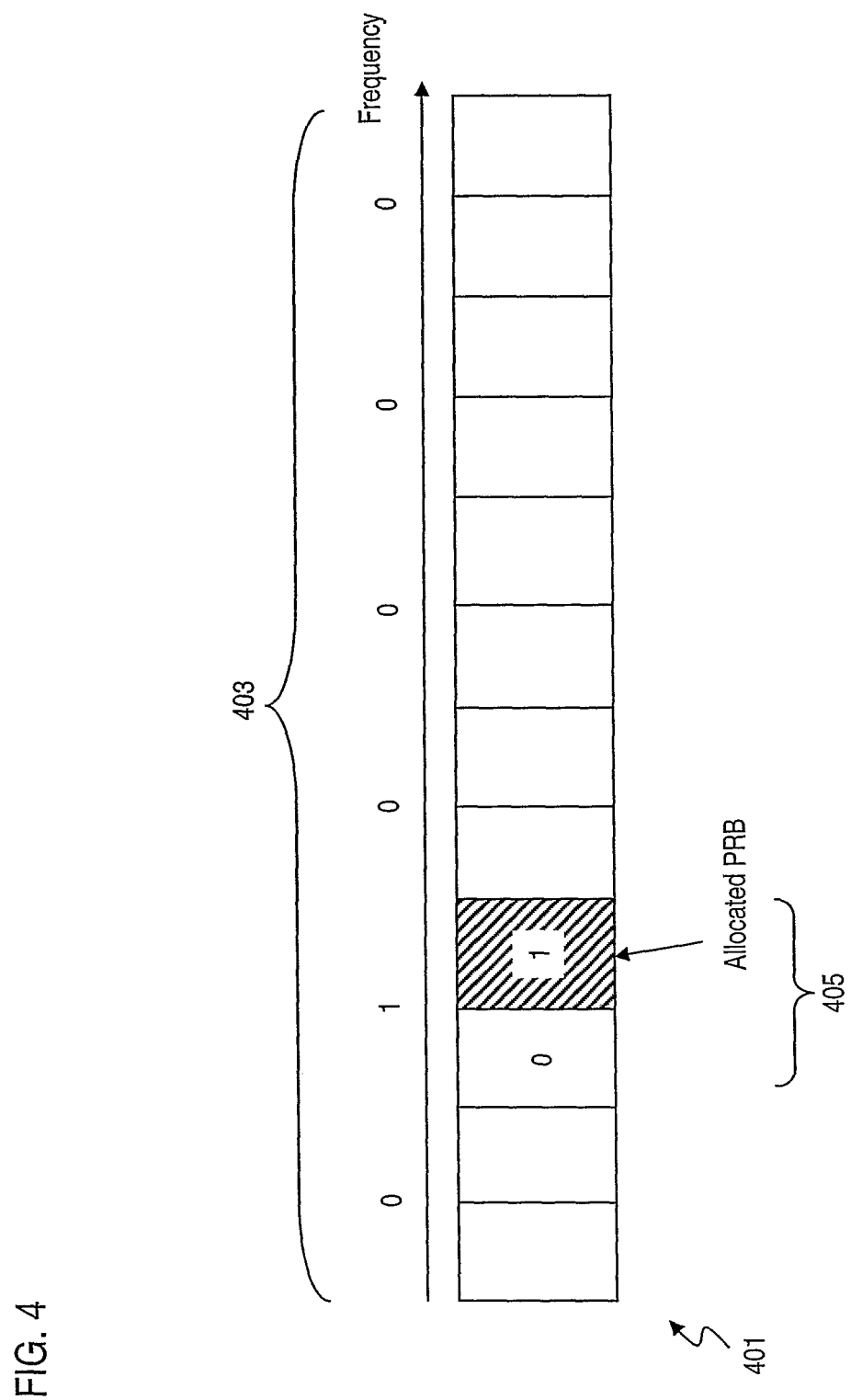
FIG. 4 is a diagram of a transport block for providing localized allocation using nested bit mapping, in accordance with an embodiment of the invention.
Figure 5:
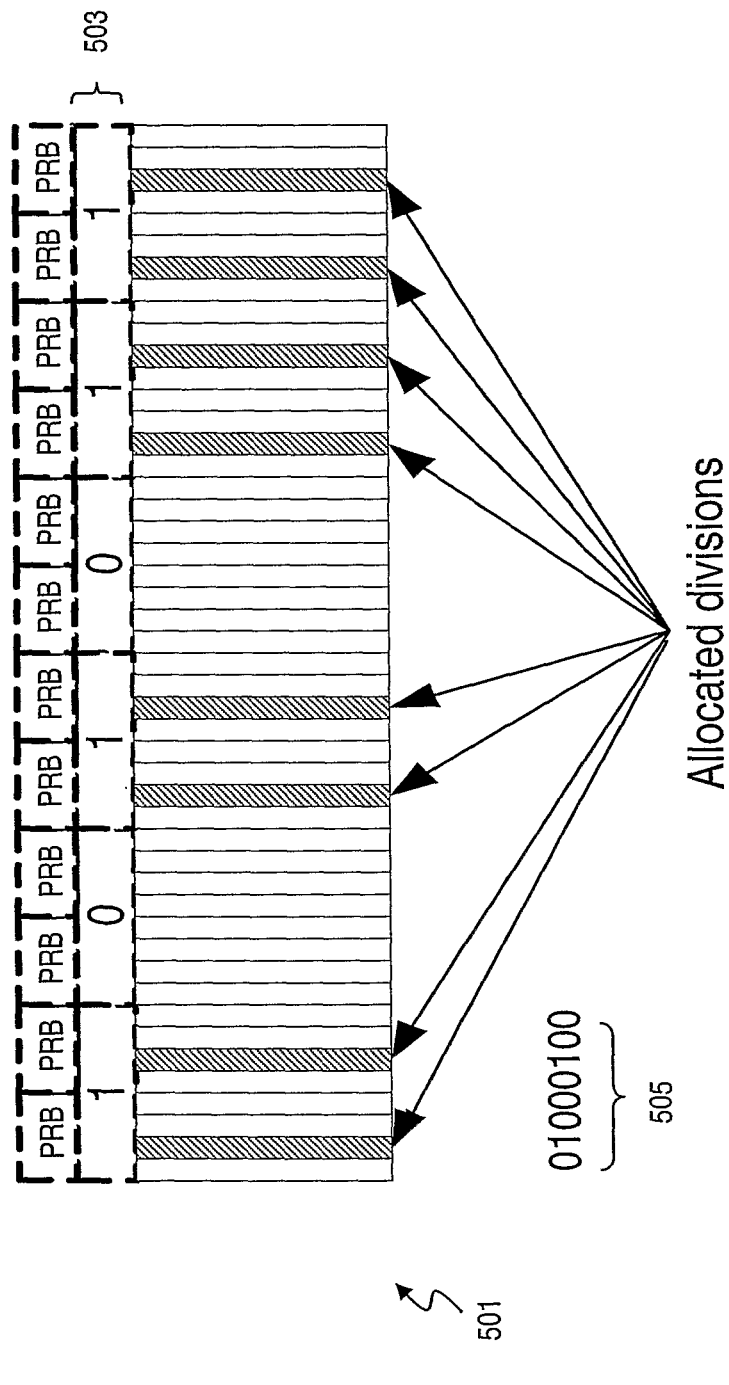
FIG. 5 is a diagram of an example of a transport block for providing distributed allocation using nested bit mapping, in accordance with an embodiment of the invention.

According to one embodiment, each bit of the secondary bit map corresponds to one PRB in the allocation unit(s) that is indicated by the primary bit map. Alternatively, the secondary bit map can correspond to one division of the allocation unit(s). Based on this allocation, in step 203, a primary bit map and a secondary bit map are assigned into physical resource blocks to specify the allocation of the physical resource blocks. Such allocations are shown in the examples of FIGS. 4 and 5.

On the user side, as seen in FIG. 2B, in step 211, the UE 101 receives a control signal that specifies a primary bit map and a secondary bit map for resource allocation within the system 100. Upon receiving the control signal, per step 213, the UE 101 examines the primary bit map to determine allocation for a set of physical resource blocks. Next, the UE 101 also examines the secondary bit map to determine the specific allocation within the set (per step 215). In step 217, eNB 103 and UE 101 can efficiently communicate over the network by utilizing the allocated resources (e.g., PRBs).

Figure 3A:
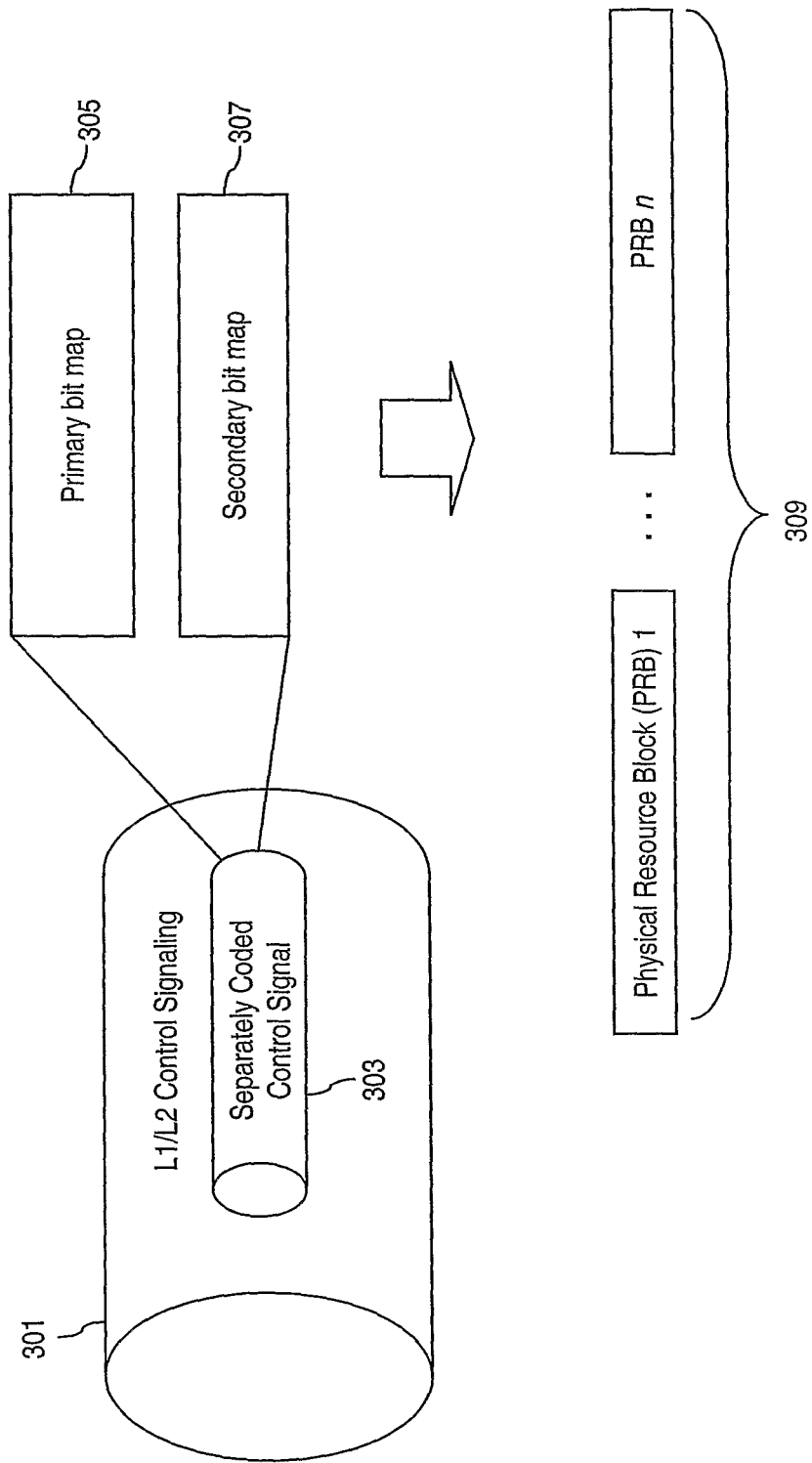
FIGS. 3A and 3B are diagrams of, respectively, a control channel providing primary and secondary bit maps, and a transmission frame providing control channels that are mapped to sub-carriers, in accordance with an embodiment of the invention.
Figure 3B:
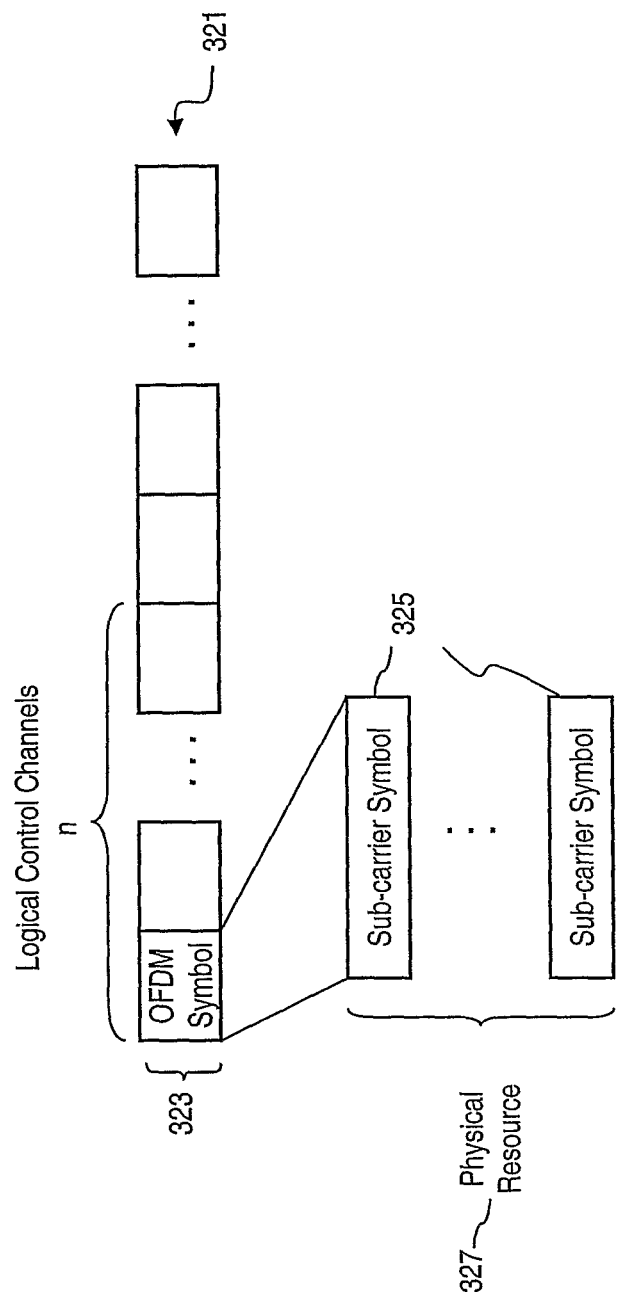

FIGS. 3A and 3B are diagrams of, respectively, a control channel providing primary and secondary bit maps, and a transmission frame providing control channels that are mapped to sub-carriers, in accordance with an embodiment of the invention. In FIG. 3A, a downlink control channel 301 carries control information needed to operate both the downlink (DL) and uplink (UL) data channels. By way of example, the elements for the control channel 301 carrying allocation for the downlink channel can include the following information: resource allocation map (i.e., description of the allocation map for the physical resource blocks), modulation scheme, transport block size or payload size, H-ARQ (Hybrid-Automatic Repeat request) information, MIMO (Multiple Input Multiple Output) information, and duration of assignment. These physical layer parameters are more fully described in 3GPP TR 25.814, entitled "Physical Layer Aspects for Evolved UTRA," v.1.5.0, May 2006 (which is incorporated herein by reference in its entirety).

The control channel 301 can provide a L1/L2 control signaling channel 303, which provides a separately coded control signal having a primary bit map 305 and a secondary (or supplemental) bit map 307 for specifying the allocation of the physical resource blocks (PRB1 ... PRBn) 309. The secondary bit map pertains to the PRBs within each allocated blocks 309 (e.g., sets of adjacent PRBs). The bit map nesting is effective, e.g., for allocation of small transport block (e.g., one PRB can be the minimum allocation size) and for supporting distributed allocation.

Scheduling information can be transmitted over the control channel 301 for downlink data transmission, scheduling grant for uplink transmission, as well as acknowledgement signal (e.g., ACK/NACK in response to uplink transmission). It is contemplated that transmission of such control information can be independent, whereby some or all information are provided at any one time. For example, ACK/NACK information can be transmitted to the UE 101 regardless of whether the same UE 101 is receiving information or not. The UE 101 and base station 103 can employ, for example, a hybrid Automatic Repeat Request (ARQ) (HARQ) scheme, as well the acknowledgement signaling logic. Automatic Repeat Request (ARQ) is an error detection mechanism used on the link layer. HARQ, which combines ARQ protocols with forward-error-correction (FEC) schemes, provides a sound error-control technique for wireless links.

Downlink scheduling information informs the UE 101 how to process the downlink data transmission. Exemplary scheduling information are provided in Table 1.

signaling is located in the first n transmission symbols (e.g., OFDM symbols 323); e.g., $n<=3$ within a transmission time interval (TTI). However, depending on the system configuration, n can be larger than 3. The number of sub-carriers 325 available in each OFDM symbol 323 depends on the system bandwidth; for example, 600 sub-carriers 325 are available in a 10 MHz system bandwidth within the context of LTE of 3GPP.

Assuming 10 MHz bandwidth, there is 50 PRB (physical resource block) 327. Traditionally, to indicate the resource allocation using bit mapping, at least 50 bits are needed for each UE 101. This can reduce the resolution of allocation for reducing the number of bits required for bit mapping, but the cost is the decrease in flexibility. Namely, it is recognized that the distributed allocation cannot be signaled, and the minimum allocation size becomes larger that one PRB.

It is noted that the number of transmit antennas for transmit diversity impacts the number of used reference symbols. The amount and positioning of the reference symbols for each transmit antenna can be predetermined.

In this example, it is assumed that the data transmission in the downlink can, at earliest, start at the same OFDM symbol as when the control signaling ends. According to one embodiment, multiple control channels are used, wherein each control channel is convolutionally coded, for example. The UE 101 can monitor the number of control channels. The number of control channels can be specified implicitly or be a cell specific parameter as a function of n. In an exemplary embodiment, one control channel carries information for one MAC (Medium Access Control) ID. Further, the power setting of each control channel can be specified by the Node B 103.

TABLE 1

| | FIELD | | COMMENT |
|---|---|---|---|
| Cat. 1 (Resource indication) | ID (UE or group specific) | | Indicates the UE (or group of UEs) for which the data transmission is intended |
| | Resource assignment | | Indicates which (virtual) resource units (and layers in case of multi-layer transmission) the UE(s) can demodulate. |
| | Duration of assignment | | The duration for which the assignment is valid, could also be used to control the Transmission Time Interval (TTI) or persistent scheduling. |
| Cat. 2 (Transport format) | Multi-antenna related information | | Content depends on the MIMO/beamforming schemes selected. |
| | Modulation scheme | | QPSK (Quadrature Phase Shift Keying), 16QAM (Quadrature Amplitude Modulation), 64QAM. In case of multi-layer transmission, multiple instances may be required. |
| | Payload size | | Interpretation could depend on, e.g. modulation scheme and the number of assigned resource units. In case of multi-layer transmission, multiple instances may be required. |
| Cat. 3 (HARQ) | If asynchronous hybrid ARQ is adopted | Hybrid ARQ process number | Indicates the hybrid ARQ process the current transmission is addressing. |
| | | Redundancy version | To support incremental redundancy. |
| | | New data indicator | To handle soft buffer clearing. |
| | If synchronous hybrid ARQ is adopted | Retransmission sequence number | Used to derive redundancy version (to support incremental redundancy) and 'new data indicator' (to handle soft buffer clearing). |

FIG. 3B is a diagram of a transmission frame providing control channels that are mapped to sub-carriers, in accordance with an embodiment of the invention. Under this scenario, transmission frame 321 pertains to downlink (DL) control signaling. In one embodiment, the downlink control The coded size of the control channel is a function of the uncoded size of a single control channel and the corresponding effective code rate of the control channel. The amount and position of dedicated 'per-cell' control information (e.g., ACK/NACK channels, Cat0 information, Paging indicator channel, etc) can be a constant size; and potentially pre-specified or be a function of system or cell-specific parameters (e.g., system bandwidth).

For the purposes of illustration, the communication system of FIG. 1 is described and possesses the following characteristics: 10 MHz system (600 sub-carriers 325 per OFDM symbol 323), 2 transmit antennas, and 80 symbols dedicated for other control information, and 3 OFDM symbols 323 dedicated for control channel signalling (n=3). Based on this configuration, a mapping of N separate control channels into sub-carrier symbols 311 can be provided.

One approach for this mapping is as follows. A numbering scheme is created such that the sub-carrier symbols 325 in the first OFDM symbol 323 are denoted 0-599, the sub-carrier symbols 325 in the second OFDM symbol 323 are denoted 600-1199 (for 10 MHz system BW), and so on. From this sequence ranging from 0-1799, the symbols that are actually available for control (1520 from the calculation above) are extracted. By removing these entries, the sequence can be re-numbered to be within the range from 0 to 1519.

The mapping scheme allows the UE 101 and network to automatically position the separately coded control channels on the available physical resources 327 in a simple and pre-determined manner.

FIG. 4 is a diagram of a transport block for providing localized allocation using nested bit mapping, in accordance with an embodiment of the invention. Under the 10 MHz system bandwidth, 180 QPSK symbols can be allocated per one enhanced High Speed Shared Control CHannel (e.g., eHS-SCCH), with ⅕ coding rate, which are 72 information bits; since 24 bits CRC including 16 bits UE ID, 48 bits are remaining (i.e., 72-24=48 bits). Another 6 bits are required for HARQ control information (CAT 3), and 5 bits for TFI (CAT 2), the total of 37 bits are remained for CAT 1 except for UE ID. Table 2 provides an example of localized allocation, using bit mapping. In this example, the allocation of PRB is determined based on a full resolution and a half-resolution.

TABLE 2

| | BIT MAP | INDICATE (START, LENGTH) |
|---|---|---|
| Full resolution using 50 allocation blocks | 50 bits already exceeds 37 bits, which is available for control signal | Start and Length need 8 bits respectively. Total 16 bits per one localized allocation -> only two localized allocation |
| Half-resolution using 25 allocation blocks (2 adjacent PRBs are combined) | Bit mapping using 25 bits can fit into 37 bits | Start and Length need 7 bits respectively. Total 14 bits per one localized allocation -> only two localized allocation |

As seen in the Table 2, half-resolution bit map can provide an acceptable approach. If two localized allocation is sufficient from the performance viewpoint, full resolution with (start, length) may be viable.

As shown in FIG. 4, an example of localized allocation is provided. A transport block 401 of adjacent physical resource blocks is allocated using the following primary bit map 403: 0 1 0 0 0 0. In this example, a minimum allocation involves one PRS of 12 sub-carriers with a symbol-duration time of, e.g., 1 ms. Thus, the minimum resource size allocated by bit map for half resolution is 24 sub-carriers×1 ms, which is referred to as an "allocation unit." In order to indicate the resource allocation within the allocated 24 sub-carrier block, at least 2 bits are needed. In this example, the primary bit map 403 is '010000' with the additional bit map (or secondary bit map) 405 of '01'. It is noted that another UE can use the same primary bit map 403 (e.g., '010000'), but with a different secondary bit map 405—i.e., '10'.

FIG. 5 is a diagram of an example of a transport block for providing distributed allocation using nested bit mapping, in accordance with an embodiment of the invention. Distributed allocation can exploit the diversity associated with multiple users, particularly when a small transport block is utilized. Basically, the remaining PRBs (after determining localized allocation) are taken into account based on prioritizing the localized allocation. Under the distributed allocation scheme, half resolution bit map can be performed to indicate the particular PRBs that are used for distributed allocation. For employing distributed allocation within one PRB, some bits are designated to indicate the resource allocation within the allocated 24 sub-carrier (2 PRBs) block.

As illustrated in FIG. 5, transport block 501 has a primary bit map 503 of '101011' and a secondary bit map 505 of '01000100.' In this example, 8 divisions are allocated within 24 sub-carrier block, and one division has three (3) adjacent sub-carriers.

Figure 6:
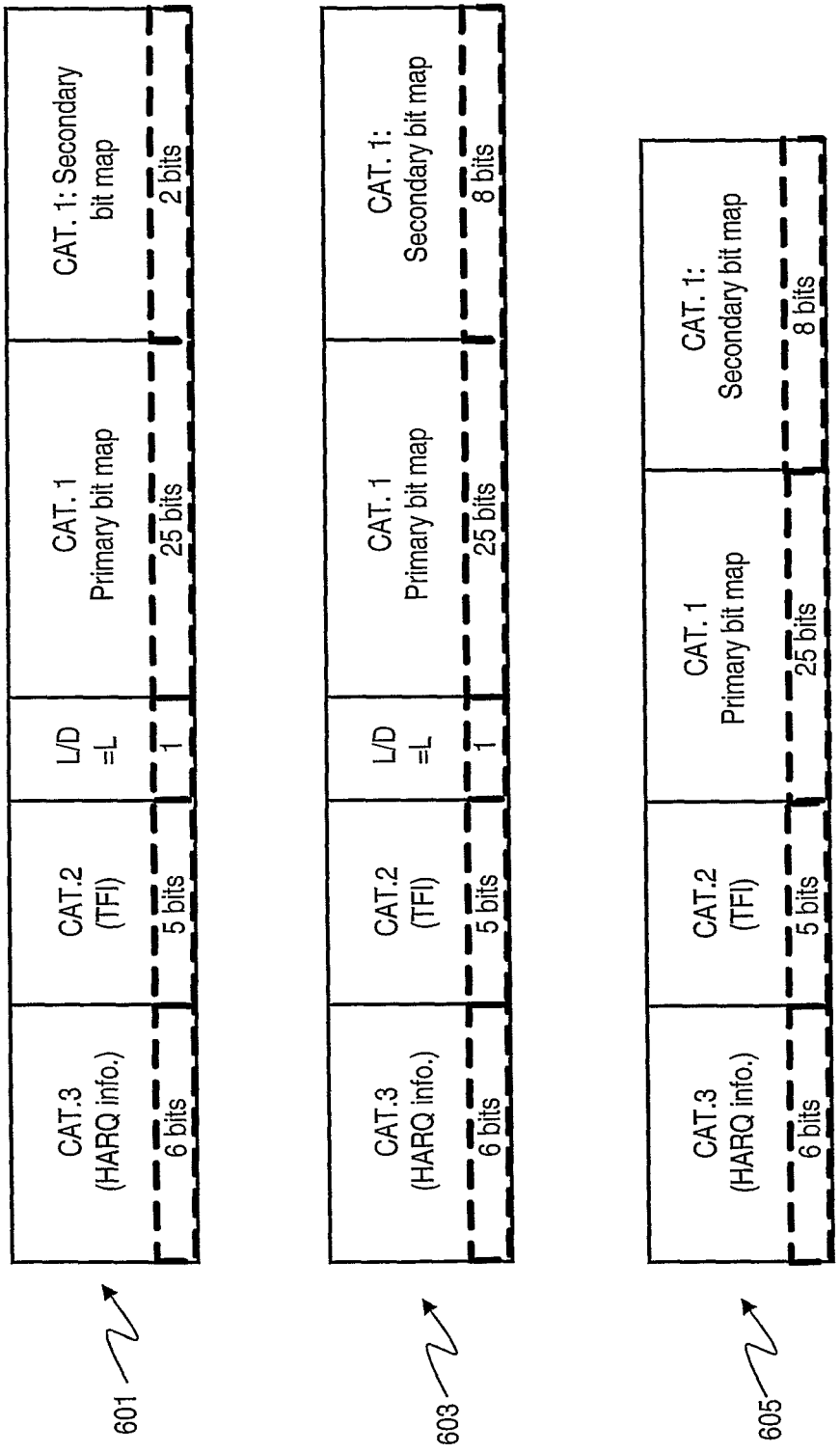
FIG. 6 is a diagram of exemplary formats of a control channel for providing primary and secondary bit maps, in accordance with an embodiment of the invention.

FIG. 6 is a diagram of exemplary formats of a control channel for providing primary and secondary bit maps, in accordance with an embodiment of the invention. In determining whether to use localized ("L") allocation or distributed ("D") allocation, an L/D flag can be used for an indication of the determination. Format 601 pertains to a localized allocation, wherein the primary bit map has 25 bits, while the secondary bit map has 2 bits. Format 603 relates to the scenario of a distributed allocation, with 25 bits being dedicated to the primary bit map and 8 bits to the secondary bit map.

In the formats 601, 603, each bit of the primary bit maps corresponds to an allocation unit. In the case of localized distribution, each bit in the secondary bit maps corresponds to a PRB, while each bit in the secondary bit map corresponds to a division in the allocation units in the case of distributed allocation.

According to one embodiment, format 605 provides no distinction between localized and distributed allocation. Instead, the manner in which the primary and secondary bit maps are utilized dictate whether the allocation resembles a localized allocation or a distributed allocation. In the example of 12 PRBs, the following mapping is distributed-like: primary bit map (101101), secondary bit map (10101010). A localized-like allocation is as follows: primary bit map (000110), secondary bit map (11111111).

The described approach for resource allocation according to certain embodiments, therefore, reduces overhead by providing nested bit mapping, while retaining flexibility in power assignment in the case of separately coded control signaling.

One of ordinary skill in the art would recognize that the processes providing resource allocation may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 7.

Figure 7:
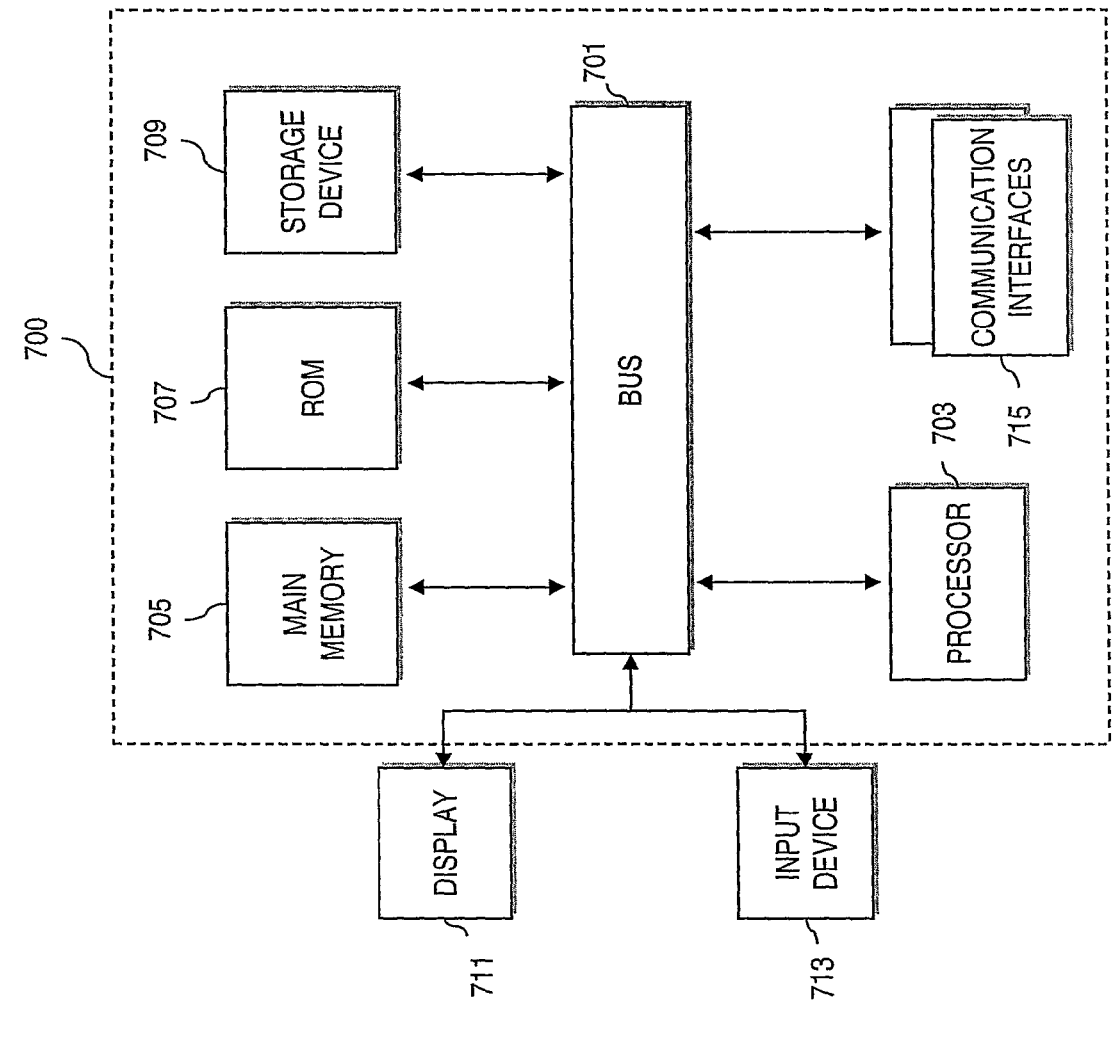
FIG. 7 is a diagram of hardware that can be used to implement an embodiment of the invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to various embodiments of the invention, the processes described herein can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 8A-8D are diagrams of communication systems having exemplary long-term evolution (LTE) architectures, in which the user equipment (UE) and the base station of FIG. 1 can operate, according to various exemplary embodiments of the invention. By way of example (shown in FIG. 8A), a base station (e.g., destination node 103) and a user equipment (UE) (e.g., source node 101) can communicate in system 800 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 8A:
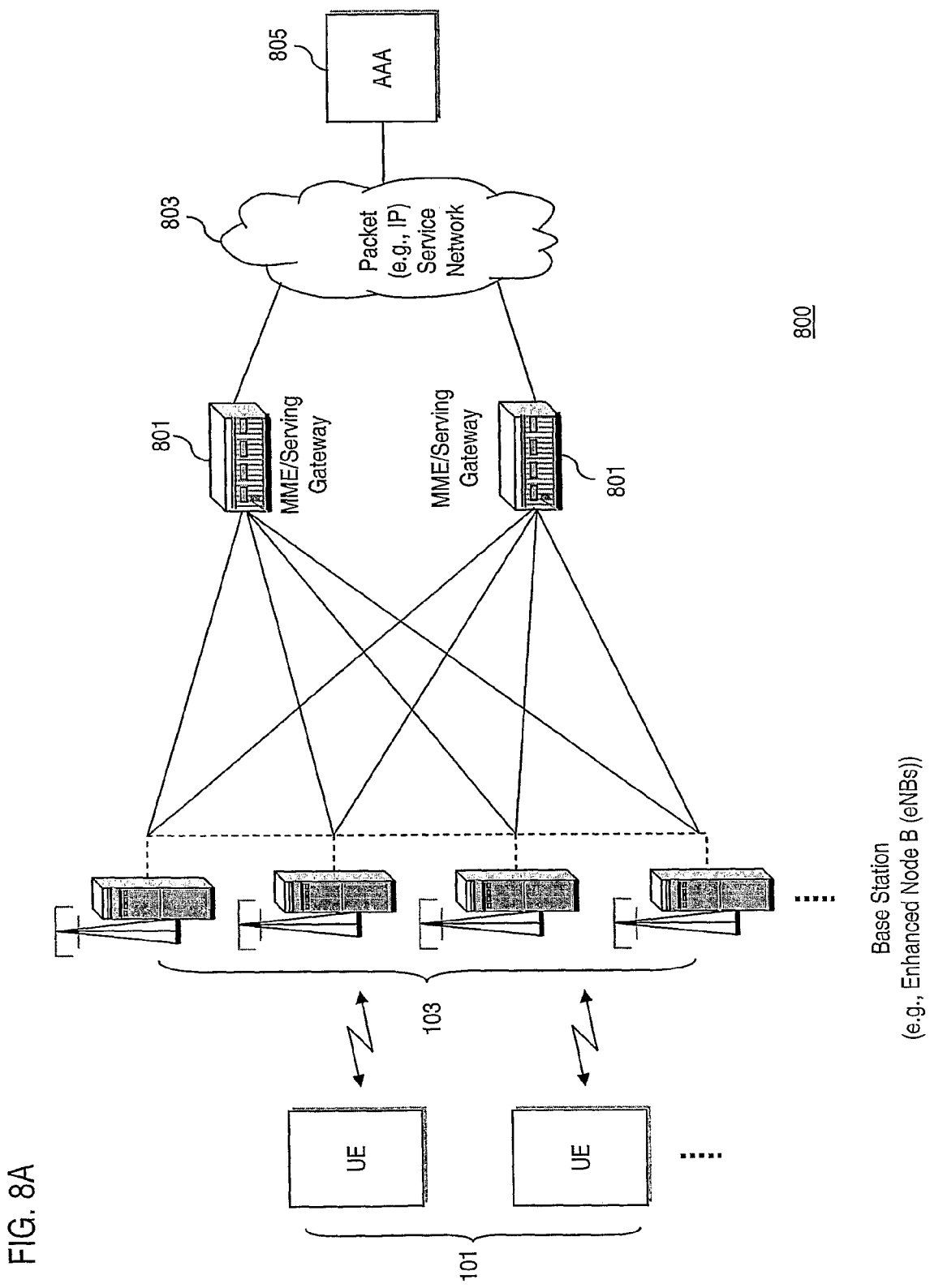
FIGS. 8A-8D are diagrams of communication systems having exemplary long-term evolution (LTE) and E-UTRA (Evolved Universal Terrestrial Radio Access) architectures, in which the system of FIG. 1 can operate, according to various exemplary embodiments of the invention.

The communication system 800 is compliant with 8GPP LTE, entitled "Long Term Evolution of the 8GPP Radio Technology" (which is incorporated herein by reference in its entirety). As shown in FIG. 8A, one or more user equipment (UEs) 101 communicate with a network equipment, such as a base station 103, which is part of an access network (e.g., WiMAX (Worldwide Interoperability for Microwave Access), 8GPP LTE (or E-UTRAN or 8.9G), etc.). Under the 8GPP LTE architecture, base station 103 is denoted as an enhanced Node B (eNB).

MME (Mobile Management Entity)/Serving Gateways 801 are connected to the eNBs 103 in a full or partial mesh configuration using tunneling over a packet transport network (e.g., Internet Protocol (IP) network) 803. Exemplary functions of the MME/Serving GW 801 include distribution of paging messages to the eNBs 103, termination of U-plane packets for paging reasons, and switching of U-plane for support of UE mobility. Since the GWs 801 serve as a gateway to external networks, e.g., the Internet or private networks 803, the GWs 801 include an Access, Authorization and Accounting system (AAA) 805 to securely determine the identity and privileges of a user and to track each user's activities. Namely, the MME Serving Gateway 801 is the key control-node for the LTE access-network and is responsible for idle mode UE tracking and paging procedure including retransmissions. Also, the MME 801 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 8B:
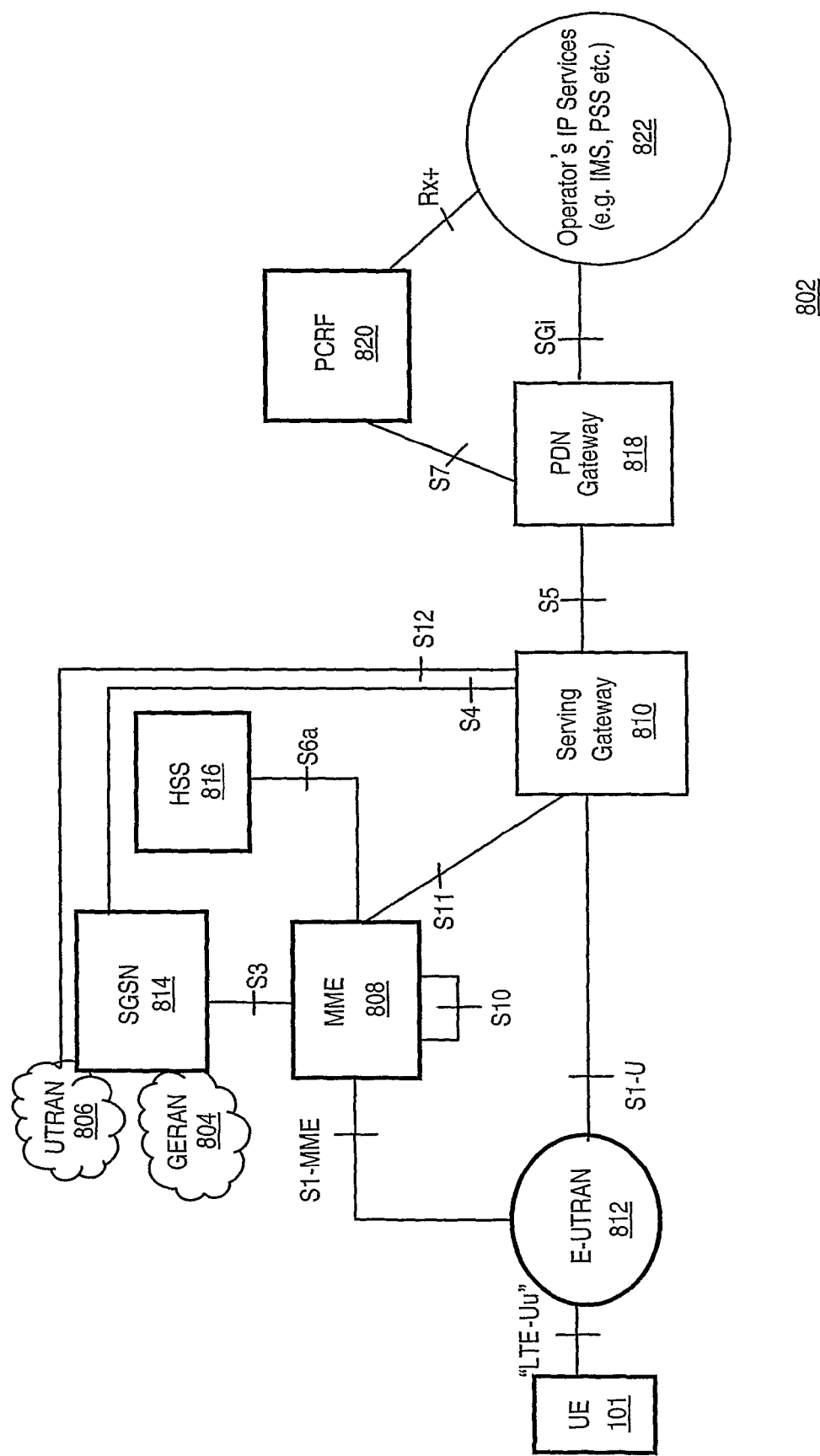

In FIG. 8B, a communication system 802 supports GERAN (GSM/EDGE radio access) 804, and UTRAN 806 based access networks, E-UTRAN 812 and non-3GPP (not shown) based access networks, and is more fully described in TR 23.882, which is incorporated herein by reference in its entirety. A key feature of this system is the separation of the network entity that performs control-plane functionality (MME 808) from the network entity that performs bearer-plane functionality (Serving Gateway 810) with a well defined open interface between them S11. Since E-UTRAN 812 provides higher bandwidths to enable new services as well as to improve existing ones, separation of MME 808 from Serving Gateway 810 implies that Serving Gateway 810 can be based on a platform optimized for signaling transactions. This scheme enables selection of more cost-effective platforms for, as well as independent scaling of, each of these two elements. Service providers can also select optimized topological locations of Serving Gateways 810 within the network independent of the locations of MMEs 808 in order to reduce optimized bandwidth latencies and avoid concentrated points of failure.

As seen in FIG. 8B, the E-UTRAN (e.g., eNB) 812 interfaces with UE 101 via LTE-Uu. The E-UTRAN 812 supports LTE air interface and includes functions for radio resource control (RRC) functionality corresponding to the control plane MME 808. The E-UTRAN 812 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 808, as a key control node, is responsible for managing mobility UE identifies and security parameters and paging procedure including retransmissions. The MME 808 is involved in the bearer activation/deactivation process and is also responsible for choosing Serving Gateway 810 for the UE 101. MME 808 functions include Non Access Stratum (NAS) signaling and related security. MME 808 checks the authorization of the UE 101 to camp on the service provider's Public Land Mobile Network (PLMN) and enforces UE 101 roaming restrictions. The MME 808 also provides the control plane function for mobility between LTE and 2G/3G access networks with the S3 interface terminating at the MME 808 from the SGSN (Serving GPRS Support Node) 814.

The SGSN 814 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 808 and HSS (Home Subscriber Server) 816. The S10 interface between MMEs 808 provides MIME relocation and MME 808 to MME 808 information transfer. The Serving Gateway 810 is the node that terminates the interface towards the E-UTRAN 812 via S1-U.

The S1-U interface provides a per bearer user plane tunneling between the E-UTRAN 812 and Serving Gateway 810. It contains support for path switching during handover between eNBs 103. The S4 interface provides the user plane with related control and mobility support between SGSN 814 and the 8GPP Anchor function of Serving Gateway 810.

The S12 is an interface between UTRAN 806 and Serving Gateway 810. Packet Data Network (PDN) Gateway 818 provides connectivity to the UE 101 to external packet data networks by being the point of exit and entry of traffic for the UE 101. The PDN Gateway 818 performs policy enforcement, packet filtering for each user, charging support, lawful interception and packet screening. Another role of the PDN Gateway 818 is to act as the anchor for mobility between 8GPP and non-3GPP technologies such as WiMax and 8GPP2 (CDMA 1× and EvDO (Evolution Data Only)).

The S7 interface provides transfer of QoS policy and charging rules from PCRF (Policy and Charging Role Function) 820 to Policy and Charging Enforcement Function (PCEF) in the PDN Gateway 818. The SGi interface is the interface between the PDN Gateway and the operator's IP services including packet data network 822. Packet data network 822 may be an operator external public or private packet data network or an intra operator packet data network, e.g., for provision of IMS (IP Multimedia Subsystem) services. Rx+ is the interface between the PCRF and the packet data network 822.

Figure 8C:
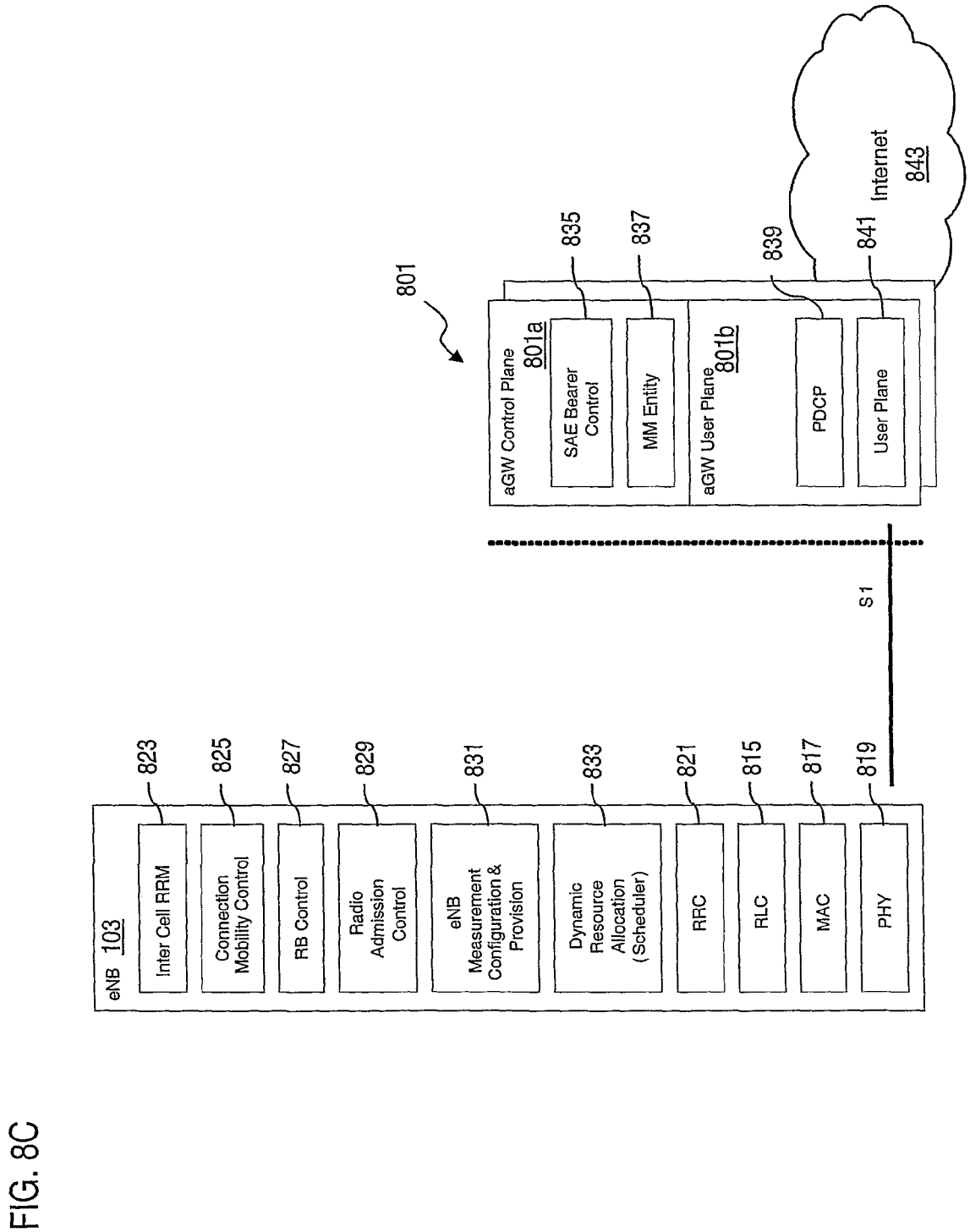

As seen in FIG. 8C, the eNB 103 utilizes an E-UTRA (Evolved Universal Terrestrial Radio Access) (user plane, e.g., RLC (Radio Link Control) 815, MAC (Media Access Control) 817, and PHY (Physical) 819, as well as a control plane (e.g., RRC 821)). The eNB 103 also includes the following functions: Inter Cell RRM (Radio Resource Management) 823, Connection Mobility Control 825, RB (Radio Bearer) Control 827, Radio Admission Control 829, eNB Measurement Configuration and Provision 831, and Dynamic Resource Allocation (Scheduler) 833.

The eNB 103 communicates with the aGW 801 (Access Gateway) via an S1 interface. The aGW 801 includes a User Plane 801a and a Control plane 801b. The control plane 801b provides the following components: SAE (System Architecture Evolution) Bearer Control 835 and MM (Mobile Management) Entity 837. The user plane 801b includes a PDCP (Packet Data Convergence Protocol) 839 and a user plane functions 841. It is noted that the functionality of the aGW 801 can also be provided by a combination of a serving gateway (SGW) and a packet data network (PDN) GW. The aGW 801 can also interface with a packet network, such as the Internet 843.

Figure 8D:
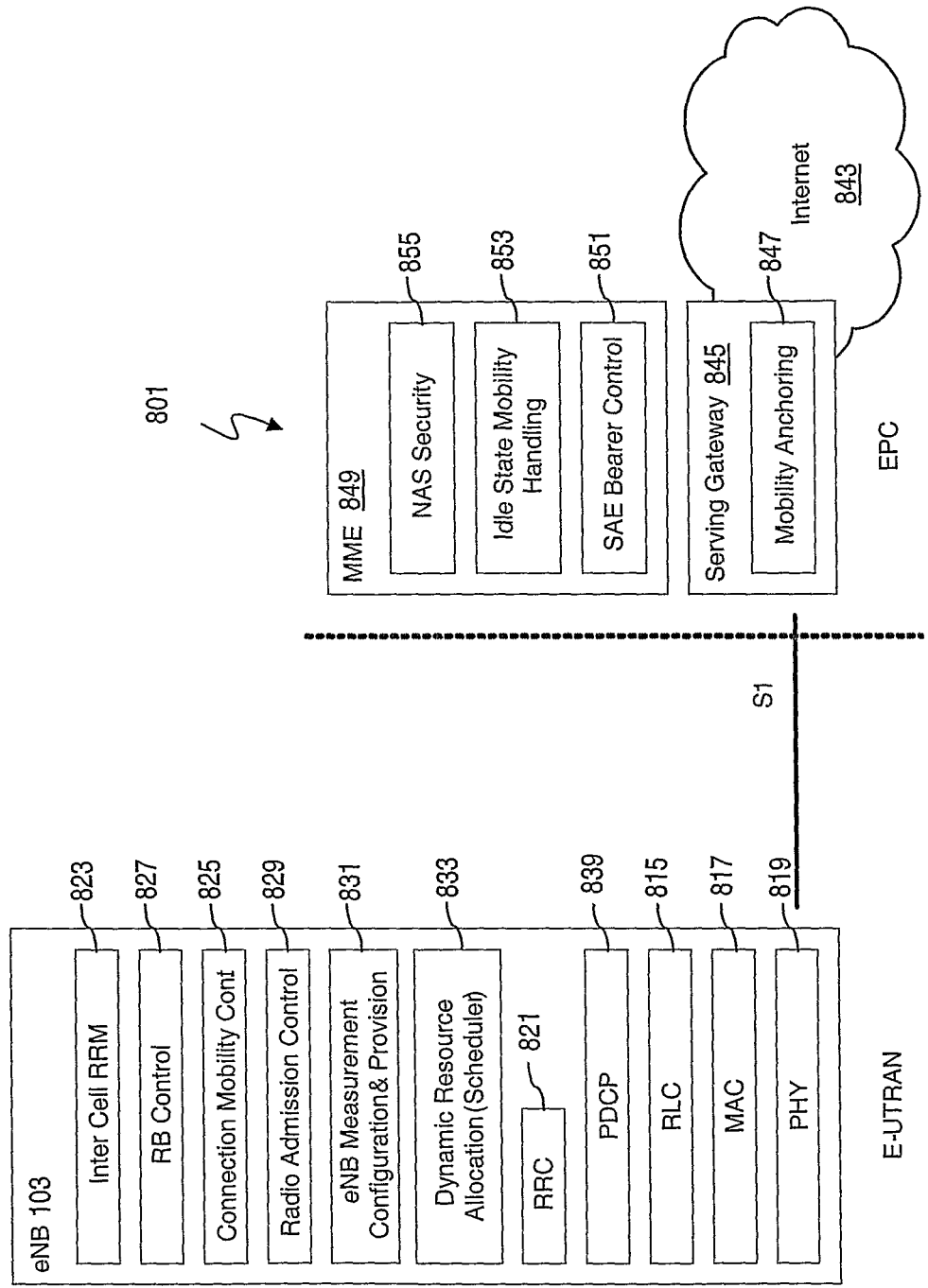

In an alternative embodiment, as shown in FIG. 8D, the PDCP (Packet Data Convergence Protocol) functionality can reside in the eNB 103 rather than the GW 801. Other than this PDCP capability, the eNB functions of FIG. 8C are also provided in this architecture.

In the system of FIG. 8D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 845, which includes a Mobility Anchoring function 847. According to this architecture, the MME (Mobility Management Entity) 849 provides SAE (System Architecture Evolution) Bearer Control 851, Idle State Mobility Handling 853, and NAS (Non-Access Stratum) Security 855.

Figure 9:
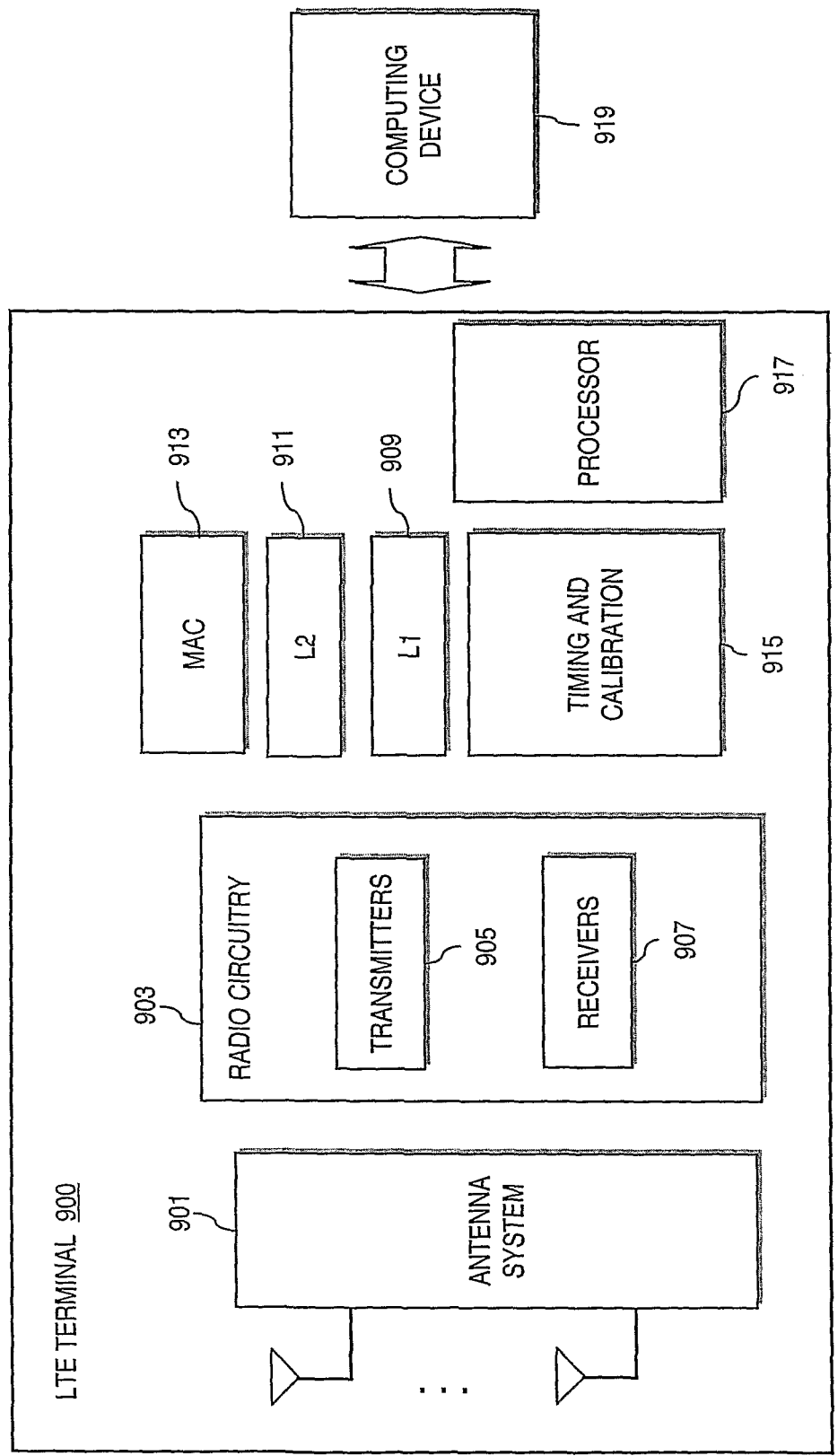
FIG. 9 is a diagram of exemplary components of an LTE terminal capable of operating in the systems of FIGS. 8A-8D, according to an embodiment of the invention.

FIG. 9 is a diagram of exemplary components of an LTE terminal capable of operating in the systems of FIGS. 8A-8D, according to an embodiment of the invention. An LIE terminal 900 is configured to operate in a Multiple Input Multiple Output (MIMO) system. Consequently, an antenna system 901 provides for multiple antennas to receive and transmit signals. The antenna system 901 is coupled to radio circuitry 903, which includes multiple transmitters 905 and receivers 907. The radio circuitry encompasses all of the Radio Frequency (RF) circuitry as well as base-band processing circuitry. As shown, layer-1 (L1) and layer-2 (L2) processing are provided by units 909 and 911, respectively. Optionally, layer-3 functions can be provided (not shown). Module 913 executes all MAC layer functions. A timing and calibration module 915 maintains proper timing by interfacing, for example, an external timing reference (not shown). Additionally, a processor 917 is included. Under this scenario, the LTE terminal 900 communicates with a computing device 919, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
generating, via at least one processor selected from a DSP chip, an ASIC, or a FPGA, a control signal for allocating one or more physical resource blocks to a terminal for communicating over a network;
individually coding the control signal for each of a plurality of terminals;
utilizing a nested bit mapping scheme to specify the allocation in the control signal;
wherein the nested bit mapping scheme provides a primary bit map corresponding to different subsets of physical resource blocks, and a secondary bit map, each bit of the secondary bit map corresponding to a single physical resource block within a subset of physical resource blocks indicated by the primary bit map;
transmitting, via a transceiver, the control signal; and
receiving/transmitting, via the transceiver, data using the allocation specified by the control signal.

2. A method according to claim 1, wherein the secondary bit map has fewer bits than the primary bit map.

3. A method according to claim 2, wherein each bit of the secondary bit map corresponds to one division of the set as indicated by the primary bit map.

4. A method according to claim 1, wherein the control signal includes a flag to specify whether the allocation is localized or distributed.

5. A method according to claim 1, wherein the network is compliant with a long term evolution (LTE)-compliant architecture.

6. An apparatus comprising:
an allocation module, including coding logic and resource mapping logic, configured to generate a control signal for allocating one or more physical resource blocks to a terminal for communicating over a network employing OFDM (Orthogonal Frequency Divisional Multiplexing) as a downlink (DL) transmission scheme, wherein the control signal is individually coded for each of a plurality of terminals and utilizes a nested bit mapping scheme to specify the allocation in the control signal,
wherein the nested bit mapping scheme provides a primary bit map corresponding to different subsets of physical resource blocks, and a secondary bit map, each bit of the secondary bit map corresponding to a single physical resource block within a subset of physical resource blocks indicated by the primary bit map,
a transceiver module configured to transmit the control signal, and
the transceiver module receiving/transmitting data using the allocation specified by the control signal.

7. An apparatus according to claim 6, wherein the secondary bit map has fewer bits than the primary bit map.

8. An apparatus according to claim 6, wherein the control signal includes a flag to specify whether the allocation is localized or distributed.

9. An apparatus comprising:
a transceiver configured to receive a control signal specifying allocation of one or more physical resource blocks for communication over a network and utilizing a nested bit mapping scheme in the control signal;
a mapping module, including resource mapping logic, configured to determine the allocation according to the nested bit mapping scheme, wherein the control signal is separately coded for each of a plurality of terminals;
wherein the nested bit mapping scheme provides a primary bit map corresponding to different subsets of physical resource blocks, and a secondary bit map, each bit of the secondary bit map corresponding to a single physical resource block within a subset of physical resource blocks indicated by the primary bit map; and
the transceiver configured to transmit/receive data using the allocation specified by the control signal.

10. An apparatus according to claim 9, wherein the physical resource blocks within the set are adjacent to one another.

11. An apparatus according to claim 9, wherein the secondary bit map is has fewer bits than the primary bit map.

12. An apparatus according to claim 9, wherein each bit of the secondary bit map corresponds to one division of the set as indicated by the primary bit map.

13. The method of claim 1 wherein for at least one of the plurality of terminals, the secondary bit map of the individually coded control signal indicates a bit value of 1 for the single physical resource block, and the single physical resource block is allocated to the terminal.

14. The method of claim 1 wherein the different subsets of the physical resource blocks are non-overlapping subsets of physical resource blocks.

15. The method of claim 1 wherein the secondary bit map is 2 bits.

16. The method of claim 1 wherein bits of the secondary bit map, from a most significant bit to a least significant bit, correspond to a single physical resource block in an increasing frequency order.

17. The apparatus of claim 6 wherein for at least one of the plurality of terminals, the secondary bit map of the individually coded control signal indicates a bit value of 1 for the single physical resource block, and the single physical resource block is allocated to the terminal.

18. The apparatus of claim 9 wherein for at least one of the plurality of terminals, the secondary bit map of the individually coded control signal indicates a bit value of 1 for the single physical resource block, and the single physical resource block is allocated to the terminal.

* * * * *